US008429604B1

(12) United States Patent
Blas et al.

(10) Patent No.: US 8,429,604 B1
(45) Date of Patent: Apr. 23, 2013

(54) SYSTEM AND METHOD FOR EXTRACTING BEHAVIORAL CODE FROM A SOFTWARE CODE FILE

(75) Inventors: Joaquin Blas, Pacifica, CA (US); Jorge Taylor, Burlingame, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1388 days.

(21) Appl. No.: 12/115,348

(22) Filed: May 5, 2008

(51) Int. Cl.
*G06F 9/44* (2006.01)

(52) U.S. Cl.
USPC .......................................... 717/113; 717/109

(58) Field of Classification Search .................... None
See application file for complete search history.

(56) References Cited

U.S. PATENT DOCUMENTS

| 2002/0120940 A1* | 8/2002 | Willard ........................... 725/91 |
| 2003/0103090 A1* | 6/2003 | Kelley et al. ................... 345/854 |
| 2005/0267798 A1* | 12/2005 | Panara ............................ 705/14 |
| 2006/0005207 A1* | 1/2006 | Louch et al. ................... 719/328 |
| 2007/0050476 A1* | 3/2007 | Etgen et al. .................... 709/219 |
| 2007/0174772 A1* | 7/2007 | Gorman ......................... 715/716 |
| 2008/0092066 A1* | 4/2008 | Edlund et al. .................. 715/760 |
| 2008/0139191 A1* | 6/2008 | Melnyk et al. ................. 455/419 |
| 2008/0196004 A1* | 8/2008 | Choi et al. ..................... 717/107 |
| 2009/0119675 A1* | 5/2009 | Higgins et al. ................ 719/311 |

* cited by examiner

*Primary Examiner* — Wei Zhen
*Assistant Examiner* — Adam R Banes
(74) *Attorney, Agent, or Firm* — Kilpatrick Townsend & Stockton LLP

(57) ABSTRACT

Systems and methods for extracting behavioral code from a software code file are disclosed. A behavioral code extractor logic accesses an existing software code file that comprises structural code and behavioral code. The behavioral code extractor logic extracts, from the software code file, at least a portion of the behavioral code into a separate file. And, the behavioral code extractor logic generates binding code for referencing the extracted behavioral code to maintain run-time behavior of the software code file consistent with its run-time behavior before the extracting. In certain embodiments, the software code file is a source file for a web page, and the structural code comprises markup language code. The behavioral code may comprise scripting language code and/or event attributes code defined by markup language.

26 Claims, 11 Drawing Sheets

SYSTEM AND METHOD FOR EXTRACTING BEHAVIORAL CODE FROM A SOFTWARE CODE FILE

CROSS-REFERENCE TO RELATED APPLICATIONS

N/A.

TECHNICAL FIELD

The following disclosure relates generally to software coding of computer-executable software programs, such as web pages and software applications, and more specifically to systems and methods for extracting behavioral code from a software code file, thereby enabling behavioral code to be separated from structural and/or stylistic code.

BACKGROUND

Many software development tools are available today for use by software designers (or "developers") in creating various types of software applications. Software "designers" and "developers" are used interchangeably herein, and generally refer to anyone involved with using a software development tool (or "authoring tool") for authoring a software program. Authoring may include coding, designing, and/or otherwise creating or modifying the software program. A software program, as used herein, generally refers to any software program that may be executed by a processor (or interpreter of some type) in order to perform operations defined by the instructions of the software program, including as an example presenting a user interface to a display. One example of such a software program is a web page, which may be defined by one or more source files that may be coded in markup language, such as HTML, XML, etc., style sheet language (e.g., Cascading Style Sheet language), scripting language (e.g., JavaScript), and/or other underlying page source code that may be read and interpreted by a browser to generate a corresponding output presentation of the web page to a display.

In a software development environment, a developer may interact with a software development tool for writing code, compiling the code, testing or debugging the code, and packaging the resulting program for deployment in a run-time environment. The software development tool may be implemented as a software application that is stored to a computer-readable medium and executed by a computer processor to perform the tasks associated with aiding a developer in the development of a software program. As one example, an integrated development environment (IDE) is commonly used for developing software programs. In general, an IDE is a programming environment that has been packaged as a software application, typically including a code editor, a compiler, a debugger, and a graphical user interface (GUI) builder. The IDE may be a stand-alone application or may be included as part of one or more existing and compatible applications. IDEs provide a user-friendly framework for many modern programming languages, such as Visual Basic, Java, and PowerBuilder. IDEs for developing source code for web pages, such as markup language (e.g., HTML, XML, etc.) code, CSS code, and/or JavaScript code, are among the most commonly used.

Thus, IDEs provide software authoring tools that allow a developer e.g., a web developer) to create web pages, websites, interactive applications, and the like for use by end users (e.g., visitors to websites). Various IDEs exist in the current marketplace, such as DREAMWEAVER®, available from Adobe Systems Incorporated, and FRONTPAGE®, available from Microsoft Corporation. DREAMWEAVER is one example of a software authoring tool that allows web developers to design Hypertext Markup Language (HTML) web pages in both a code editor and a graphical-based design time environment. DREAMWEAVER also allows the developer to design in other markup languages, such as, for example, Extensible Markup Language (XML), Extensible HTML (XHTML), Active Server Page (ASP), COLDFUSION™ Markup Language (CFML™), and the like.

Many software application authoring tools, as may be provided by an IDE, are available today for use by software developers in creating various types of software programs, including as examples such software code authoring tools as ADOBE® DREAMWEAVER® and MICROSOFT® FRONTPAGE®. Certain authoring tools, such as ADOBE® DREAMWEAVER®, allow a developer to create a document in an environment that includes both a text-based code view and a graphical-based design view. The code view renders the source code (e.g., markup language code) as text in a portion of the screen and allows the developer to see and manipulate the source code in the document file. For example, the developer may write and edit HTML, Cascading Style Sheets (CSS), and/or scripting language (e.g., javaScript) code in the code view. The design view (or "display view"), on the other hand, is a What You See Is What You Get (WYSIWYG) view of the document that allows the user to visually manipulate the interpreted and graphically laid-out version of the document, such as, for example, by dragging, dropping, cutting, and pasting visual components. For instance, techniques similar to those employed by browsers may be employed for presenting the resulting output presentation (e.g., web page) of the underlying source code, wherein the developer may manipulate such output presentation within the design view. As the developer works, changes to the document are reflected in both the code view and the design view.

Once a designer creates web page source code (which may be referred to as a "source page"), such web page source code is typically stored to a web server that is accessible by clients via a communication network, such as the Internet. The clients may access the web server and download the source code, which a browser executing on the client's computer interprets to generate a corresponding output presentation, as is well known in the art.

Software programs, such as web page source code files, may comprise various types of code, including as examples structural code, stylistic code, and behavioral code. In general, "structural code" refers to instructions that define the structure of the run-time program, such as the structure of the presentation output of a web page by a browser. As an example, markup language code, such as HTML, can be used to define the structure of a presentation output document that is generated by a web browser when the browser is interpreting such markup language code. HTML and its successor languages, such as XHTML, have been generally used to define the structure of web pages from the very early stages of the well-known World Wide Web (the "web") portion of the Internet. Traditionally, markup tags defining the structure, such as those defining headings, paragraphs, lists, tables, and the like (i.e., structural markup) are coded using a markup language, such as HTML, in the underlying source code of a web page.

In general, "stylistic code" refers to instructions that define the style of the run-time program, such as the style of the presentation output of a web page by a browser. Again, as an example, a markup language, such as HTML or XHTML, may be used to define the style of a web page that is to be generated by a web browser when the browser is interpreting such markup language code. Traditionally, markup tags defining the style of the page content presented by a browser, such as bold, underlined, font, font size, and the like (i.e., stylistic markup) are coded using a markup language, such as HTML, in the underlying source code of a web page.

In general, "behavioral code" refers to instructions that define the functional run-time behavior of the program. Such functional run-time behavior may define how the program is to react to certain events, such as user input events, etc. As examples, the behavioral code may define certain operational functions that are to be performed upon a page being loaded by a browser (e.g., an "onload event"), the behavioral code of a program may define functional operations to be performed by the program responsive to a user moving a cursor over a particular element being shown on a user interface (e.g., a "mouse-over event"), and/or the behavioral code of a program may define functional operations to be performed by the program responsive to a user clicking a button on a user interface. Such behavioral code is commonly coded using a scripting language, such as JavaScript, and/or via the use of a markup language (e.g., HTML) event attribute, like onclick, onmouseover, etc.

Accordingly, a structural arrangement of a run-time output presentation (e.g., of a web page by a browser) may be defined by structural code of a source code file, the stylistic presentation of the page (e.g., the visual look, such as color, font, etc.) may be defined by stylistic code of the source code file, and the behavior of the page (e.g., functional operation responsive to certain events, such as user input) may be defined by behavioral code of the source code file. Traditionally, an underlying source code file may comprise each of the structural code, stylistic code, and behavioral code for a program. For instance, in a source file for a web page, markup tags defining the structure, such as those defining headings, paragraphs, lists, tables, and the like (i.e., structural markup), may be included in an HTML document along with markup tags defining the style and appearance of the page content, such as bold, underlined, font, font size, and the like (i.e., stylistic markup), and behavioral code such as JavaScript and/or other behavioral code may additionally be included in such HTML source file. To enhance the appearance and operational functionality of web pages, developers are including increasing amounts of stylistic markup and behavioral code in such web page source code.

However, with all of such stylistic markup and behavioral code being included along with the structural coding of the document, the underlying source code document (e.g., HTML document) for even the most basic web page often becomes undesirably long and complicated, which results in increased difficulty in creating and editing the markup language documents defining the web pages. Further, the interleaved inclusion of the structural code, stylistic code, and behavioral code creates difficulty and inefficiency for developers in recognizing and analyzing each of these portions of the program. For instance, it may be difficult for a developer to recognize and analyze the structure of a page because of the added "noise" in the underlying source document that results from the further inclusion of the stylistic and behavioral code. In addition, a source code file containing structural code, stylistic code, and behavioral code is often undesirably large and is undesirably inefficient from a code reuse point of view (e.g., does not readily permit the reuse of stylistic and/or behavioral code across multiple pages).

Thus, separating structural code from stylistic code and/or behavioral code is emerging as a desirable best practice in software development. For example, with regard to separating out stylistic code, style sheet languages, such as Cascading Style Sheets (CSS), have been developed to aid in defining the styling for a given document, such as a web page. CSS is a popular style sheet language commonly used to describe the style/presentation (e.g., colors, fonts, layout, etc.) of documents written in markup language. By using a markup language (e.g., HTML) and style sheet language (e.g., CSS) together, web designers are able to advantageously separate a web page's structure and content (written in markup language) from its style (or "presentation formatting"), written in style sheet language. For instance, using CSS, developers are generally able to define the style of an entire web document by defining styles in a separate CSS file, and applying those styles to the content and structure defined by a markup language file. Because the style is applied to the content, one style may be applied to multiple sections of the markup language document, thus reducing the size of the coding for defining the resulting web page. Moreover, developers may change the entire appearance of a web page by changing the CSS without effecting the content of the page.

Style sheets, such as CSS, are commonly employed to help readers of web pages (e.g., browsers) to define visual layout of a web page's content, such as colors, fonts, layout, and other aspects of document presentation. In this manner, the style sheet may be designed primarily to enable the separation of document structure and content (written in HTML or a similar markup language, e.g., in a main file) from document style (written in (CSS). Thus, the main HTML file for a web page may be authored to define certain structure and content e.g., text, images, etc.) of an output presentation document that is to be generated when the web page is interpreted by an interpreter program (such as a client browser), and the main HTML file may reference one or more style sheets that define the visual layout of such content that is desired to be generated within the output presentation document. Such use of style sheets are well known in the art.

As a further example, with regard to separating out behavioral code, such as JavaScript code, a separate behavioral code file (e.g., JavaScript file) may be created that contains the code defining the behavior of the given software program, such as a web page. For instance, a scripting language file, such as JavaScript (JS) files, are commonly employed to provide functions that may be executed during run-time of a web page by a browser to further define the behavior of the output presentation document (e.g., web page) presented by the browser. Such use of scripting language files are also well known in the art. Thus, a main web page document (e.g., main HTML document) may contain structural code (and certain content) for the web page, and the main web page document may reference one or more related files, such as style sheet files that contain stylistic code and/or behavioral files (e.g., scripting language files) that contain behavioral code for imparting certain behavior/functionality for the output presentation document presented by the browser.

Separating behavior from structure in web page documents is emerging, for example, as a recommended practice for maintaining clean semantic HTML markup that is free of any attributes or script that introduces custom behaviors. A desire has thus been recognized for having any custom behaviors that are introduced into an HTML page to come from external files that unobtrusively attach/bind the behaviors to elements within the semantic markup. Like the practice of separating style from structure, this separation of behavior from structure may provide one or more benefits, some of which may include:

a) the ability to make incremental modifications to the HTML markup structure or the behavior code independently without having to modify the other;

b) because the behavior implementation is externalized, it can be shared across multiple HTML pages, so the bandwidth necessary to view these pages is reduced since the files related to the behaviors can be downloaded and cached by the browser once. This also results in smaller HTML pages since the behavior code is not duplicated within the actual markup itself; and c) since the HTML markup is smaller and semantic, it may also be easier to read, which may aid accessibility with screen readers, search engine web crawlers, and browsers or other user agents that do not necessarily support the behaviors implemented for the page.

With regard to separating behavioral code from structural code, a desire has been recognized for an "Unobtrusive JavaScript" technique. In general, such Unobtrusive JavaScript refers to the practice of separating out any JavaScript behavior code from a page's content structure and presentation. With Unobtrusive JavaScript, only <script> tags that include external JavaScript files are allowed within the source document being coded. The general goal of such Unobtrusive JavaScript technique is to eliminate the use of any <script> tags with inline JavaScript and the use of any HTML behavioral/event attributes, like onclick, onmouseover, etc., that make use of JavaScript from within the content markup itself and externalize this code in a separate JavaScript file which gets included by a <script> tag with a "src" attribute. Thus, these externalized behaviors will get programmatically attached to the elements at some point during the document loading process, most likely after the window onload event fires, with the use of the DOM APIs which allow event handlers to be added/removed programmatically.

Traditionally, achieving such separation of structural code and behavioral code is coding-intensive for developers. For instance, developers have traditionally been required to manually identify in-line behavioral code (e.g., JavaScript code, markup language behavioral event attributes, etc.) within a source code document that is desired to be extracted. In addition, developers are further required to manually write code to unobtrusively attach/bind the extracted behaviors to elements within the source code document. The developers would then have to manually strip out all of the behaviors that were externalized from the source code document, and include the file containing the code that does the attaching/binding. Unobtrusive attachment/binding of behaviors typically involves writing code that gets triggered after the document's onload event notification is fired. This code typically makes DOM calls that either attach event handlers or set attributes/properties on elements within the HTML document. Unfortunately, writing this code is sometimes difficult for, or beyond the scope of, many developers, such as those who may use software authoring tools like DREAMWEAVER who are accustomed to attaching behaviors to page elements visually with a user interface.

Accordingly, a desire exists for an improved system and method for extracting behavioral code from a source code document.

SUMMARY

Concepts disclosed herein are directed generally to systems and methods for extracting behavioral code from a software code file. According to certain embodiments, behavioral code extractor logic accesses an existing software code file that comprises structural code and behavioral code. The behavioral code extractor logic extracts, from the software code file, at least a portion of the behavioral code into a separate file. And, the behavioral code extractor logic generates binding code for binding the extracted behavioral code with the software code file to maintain run-time behavior of the software code file consistent with its run-time behavior before the extracting. That is, in certain embodiments, the run-time behavior of the program (e.g., web page) resulting from the separate structural code and behavioral code files functions as it did when the structural and behavioral code were contained within a common software code file. Thus, as discussed further herein, the behavioral code extractor logic aids a developer in generating, from an existing source code document that comprises both structural code and behavioral code, a separation of the behavioral code (e.g., in a separate file) from the existing source code document without breaking the run-time behavior of the program.

While in certain embodiments the behavioral code extractor logic inserts, into the software code file, the binding code for referencing the extracted behavioral code, those of ordinary skill in the art will recognize that such binding may be achieved in other ways in some instances, and any such other binding techniques may be employed and are intended to be within the scope of the concepts described herein. For instance, in some embodiments a third file may be used to aggregate the structural code of the software code file and the extracted behavioral code. In such a case, a binding does not need to be inserted into the software code file that contains the structural code, since the third file preserves/specifies the relationship between the structural code file and the extracted behavioral code file. Thus, as referred to generally herein, "binding" (unless expressly designated as a particular type of binding technique) encompasses any technique for aggregating or binding the separated structural code file and the behavioral code file.

In certain embodiments, the software code file is a web page source code file, and the structural code comprises markup language code, such as HTML code. The behavioral code may comprise scripting language code, such as JavaScript code, and/or event handler (or "event attributes") code defined by the markup language, such as HTML event attributes like "onclick", "onmouseover", etc.

In certain embodiments, the behavioral code extractor logic performs the extracting responsive to a user request input to a software code authoring tool. In addition, in certain embodiments the behavioral code extracting logic is part of a software code authoring tool, such as DREAMWEAVER, in which the software code file (e.g., web page source code file) is being authored.

In certain embodiments, the behavioral code extractor logic identifies the behavioral code contained in the software code file, and presents a user interface that includes a list of the identified behavioral code contained the software code file. The user interface may enable the user to select one or more of the identified behavioral code in the list that is to be extracted from the software code file into the separate file. In other words, various behavioral codes contained in the software code file may be listed, and a user can select ones of the listed behavioral codes to be extracted into a separate file. Further, the user interface may also present a corresponding binding identifier for each of the one or more behavioral codes to be extracted from the software code file, wherein the binding identifier is utilized within the inserted binding code in the software code file for referencing the corresponding extracted behavioral code. And, the user interface may enable the user to modify the one or more binding identifier. Thus, the user may specify the binding identifier that is to be used within the software code file for referencing a corresponding behavioral code that is extracted.

According to certain embodiments, a behavioral code extractor analyzes an existing source code document that contains behavioral code and determines what behavioral code (e.g., scripting language code, mark-up language tags and/or attributes, such as mark-up language event attributes, etc.) can be externalized based on rules and heuristics of the behavioral code extractor, which minimize the chances of breaking the source code document's original run-time behavior. In addition, according to certain embodiments, the behavioral code extractor generates binding code for binding/attaching the behaviors that are being extracted from the source code document, which permits even users with limited coding skills to reap the benefits of separating behavior from structure. Thus, according to certain embodiments, the behavioral code extractor automates the identification, externalizing and stripping of behaviors from an existing source code document, thereby alleviating a user from being required to manually perform these tasks.

It should be understood that the behavioral code extractor may be implemented within a software code authoring tool (e.g., an IDE), or as a separately-executable tool, such as a command-line tool. In addition, in certain embodiments, the behavioral code extractor may be offered as a service on a network, such as the Internet. For example, in one embodiment a web service page may be hosted on a website, such as on the www.adobe.com website, that allows developers to access the behavioral code extractor. For instance, a developer may, via the web service page, input a URL (or other identifier) of their page, and the behavioral code extractor may perform the behavioral code extraction for such page in the manner described herein. The resulting structural code file (having the behavioral code extracted therefrom) and the resulting behavioral code file may be presented to the developer and made available for download from the hosting web server to the developer's local client-device. In this manner, in certain embodiments the behavioral code extractor may be implemented as "Software as a Service".

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosure, reference is now made to the following descriptions taken in conjunction with the accompanying drawing, in which.

DETAILED DESCRIPTION

Figure 1:
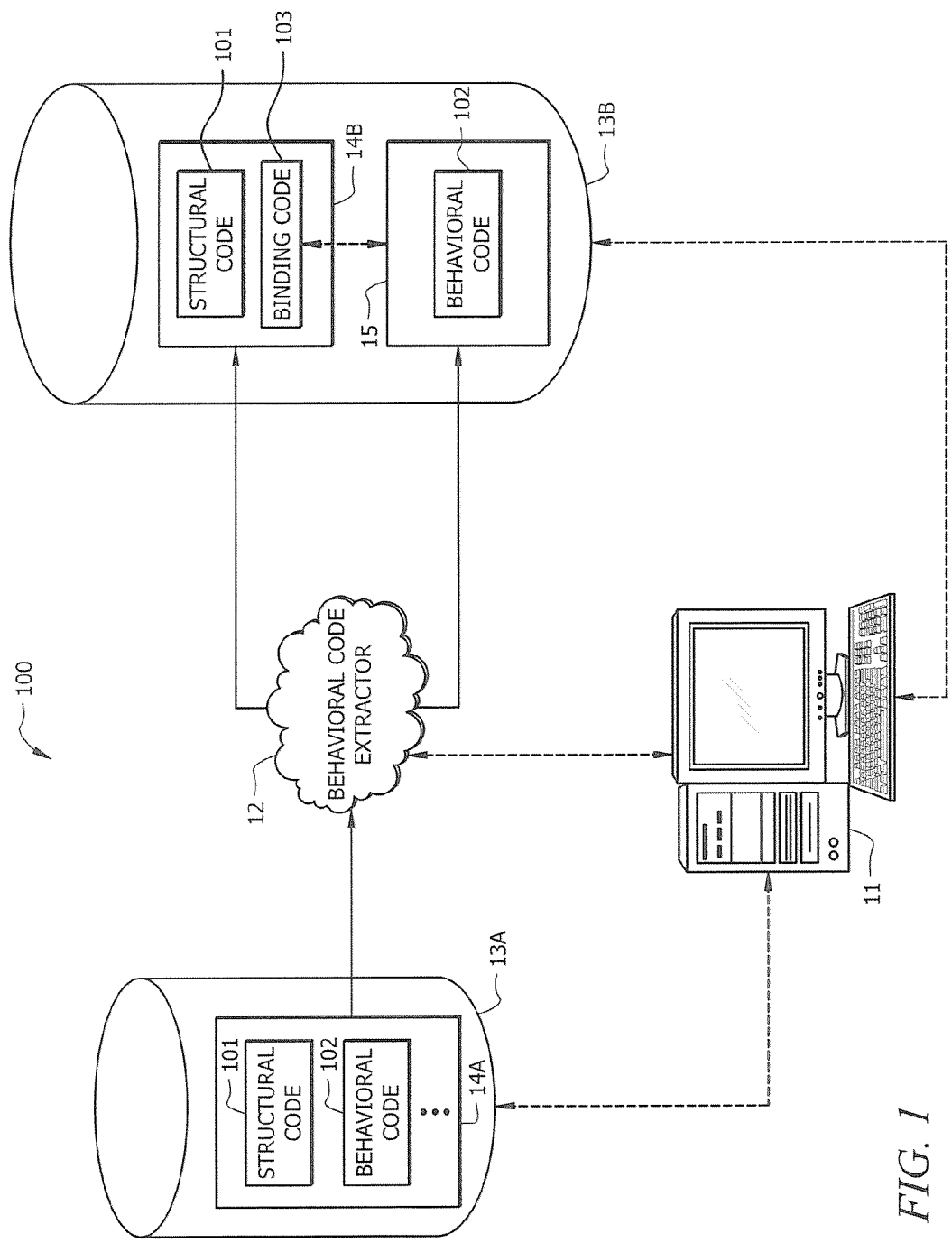
FIG. 1 shows a block diagram of a system implemented according to an exemplary embodiment.

FIG. 1 shows a block diagram of a system 100 illustrating an exemplary embodiment. As shown, system 100 comprises a processor-based computer 11, such as a personal computer (PC), laptop computer, server computer, workstation computer, etc. In this example, behavioral code extractor 12 is executing on computer 11, or behavioral code extractor 12 is executing on a remote computer (e.g., server) that is communicatively accessible by computer 11. Behavioral code extractor 12 comprises computer-executable software code stored to a computer-readable medium that is readable by a processor of computer 11 (or by a processor of a remote computer that is communicatively accessible by computer 11) and, when executed by such processor, causes the computer to perform the various operations described further herein for such behavioral code extractor 12.

As further shown, a software source code file 14A is stored to data storage 13A of computer 11. Software source code file 14A may comprise source code for a web page (e.g., that is to be interpreted by a client browser for rendering an output presentation and functionality of a web page), or software source code file 14A may comprise source code for some other type of software program. Data storage 13A may comprise a hard disk and/or other computer-readable data storage medium that is operable for storing data, which is communicatively accessible by computer 11. Data storage 13A may be arranged local to computer 11, or data storage 13A may be remote from computer 11 and communicatively accessible via a communication network.

In the illustrated example, software source code file 14A comprises both structural code 101 and behavioral code 102. As discussed further herein, the structural code may be markup language code, such as HTML code, or other code that comprises instructions that define the structure of the run-time program (when software source code file 14A is executed), such as the structure of the presentation output of a web page by a browser. As an example, markup language code, such as HTML, can be used to define the structure of a presentation output document that is generated by a web browser when the browser is interpreting such markup language code. Traditionally, markup tags defining the structure, such as those defining headings, paragraphs, lists, tables, and the like (i.e., structural markup) are coded using a markup language, such as HTML, in the underlying source code of a web page.

As discussed further herein, the behavioral code 102 comprises instructions that define the functional run-time behavior of the program. Such functional run-time behavior may define how the program is to react to certain events, such as user input events, etc. As examples, the behavioral code 102 may define certain operational functions that are to be performed upon a page being loaded by a browser e.g., an "onload event"), the behavioral code 102 may define functional operations to be performed by the program responsive to a user moving a cursor over a particular element being shown on a user interface (e.g., a "mouse-over event"), and/or the behavioral code 102 may define functional operations to be performed by the program responsive to a user clicking a button on a user interface. Such behavioral code 102 may comprise scripting language code, such as JavaScript code, and/or event handler (or "event attributes") code defined in a markup language, such as HTML event attributes like "onclick", "onmouseover", etc.

Accordingly, in this example, software source code file 14A is an existing file that was authored to include both structural code 101 and behavioral code 102. As discussed further herein, behavioral code extractor 12 is operable to access the existing software source code file 14A and extract, from the software source code file 14A, at least a portion of the behavioral code 102 into a separate file. For instance, as illustrated in FIG. 1, behavioral code extractor 12 may extract behavioral code 102 from software source code file 14A, thus resulting in software source code file 14B having the behavioral code 102 extracted therefrom. Behavioral code extractor 12 places the extracted behavioral code 102 into a separate file 15 that is stored to data storage 13B. Data storage 13B may be the same as data storage HA or it may be separate data storage similar to the above-described data storage 13A and communicatively accessible by computer 11.

Additionally, behavioral code extractor 12 inserts, into the software source code file 14B, binding code 103 for referencing the extracted behavioral code 102 to maintain run-time behavior of the software source code file 14B consistent with the run-time behavior of software source code file 14A before the extracting of behavior code 102. Thus, as discussed further herein, the behavioral code extractor 12 aids a developer in generating, from an existing source code file 14A that comprises both structural code 101 and behavioral code 102, a separation of the behavioral code 102 (e.g., in a separate file) from the existing source code document without breaking the run-time behavior of the program.

In certain embodiments, the behavioral code extractor 12 performs the extracting responsive to a user request input to a software code authoring tool. Examples of such a software code authoring tool include DREAMWEAVER®, available from Adobe Systems Incorporated, and FRONTPAGE®, available from Microsoft Corporation. Such an authoring tool may be a software application executing on computer 11 (or on another computer that is communicatively accessible by computer 11) to enable authoring of software code for a computer program, such as for web pages, etc. In many cases, such software code authoring tool enables an author (e.g., website designer) to create textual source code (e.g., source code file 14A) that defines a graphical presentation format to be generated by an outputting application (e.g., a web page output by a browser, etc.). In certain embodiments, the behavioral code extractor 12 is part of a software code authoring tool, such as DREAM WEAVER, in which the software code file 14A (e.g., web page source code file) is being authored.

Figure 2A:
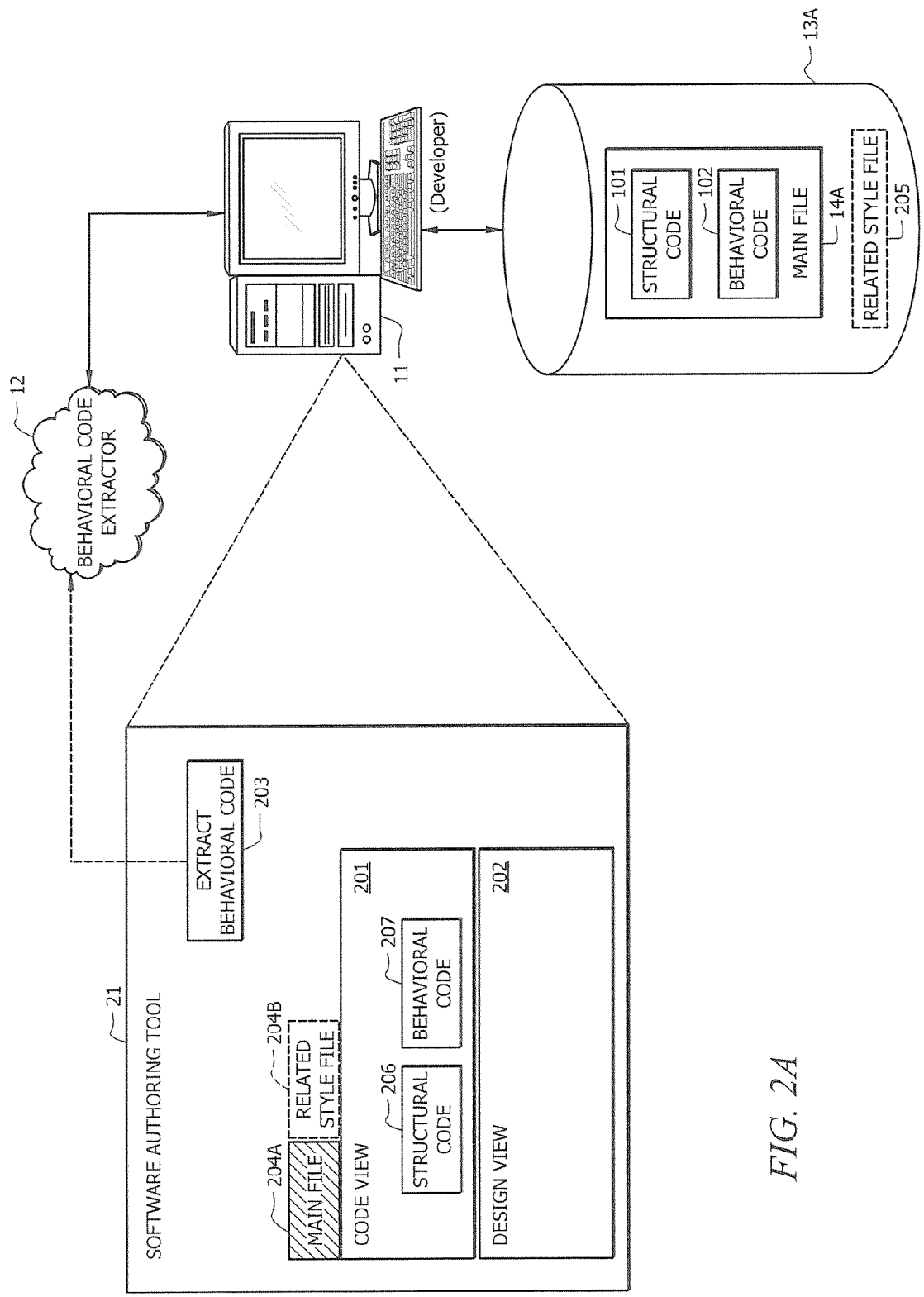
FIGS. 2A-2C show an exemplary use case scenario that is illustrative of application of a behavioral code extractor according to one embodiment.
Figure 2B:
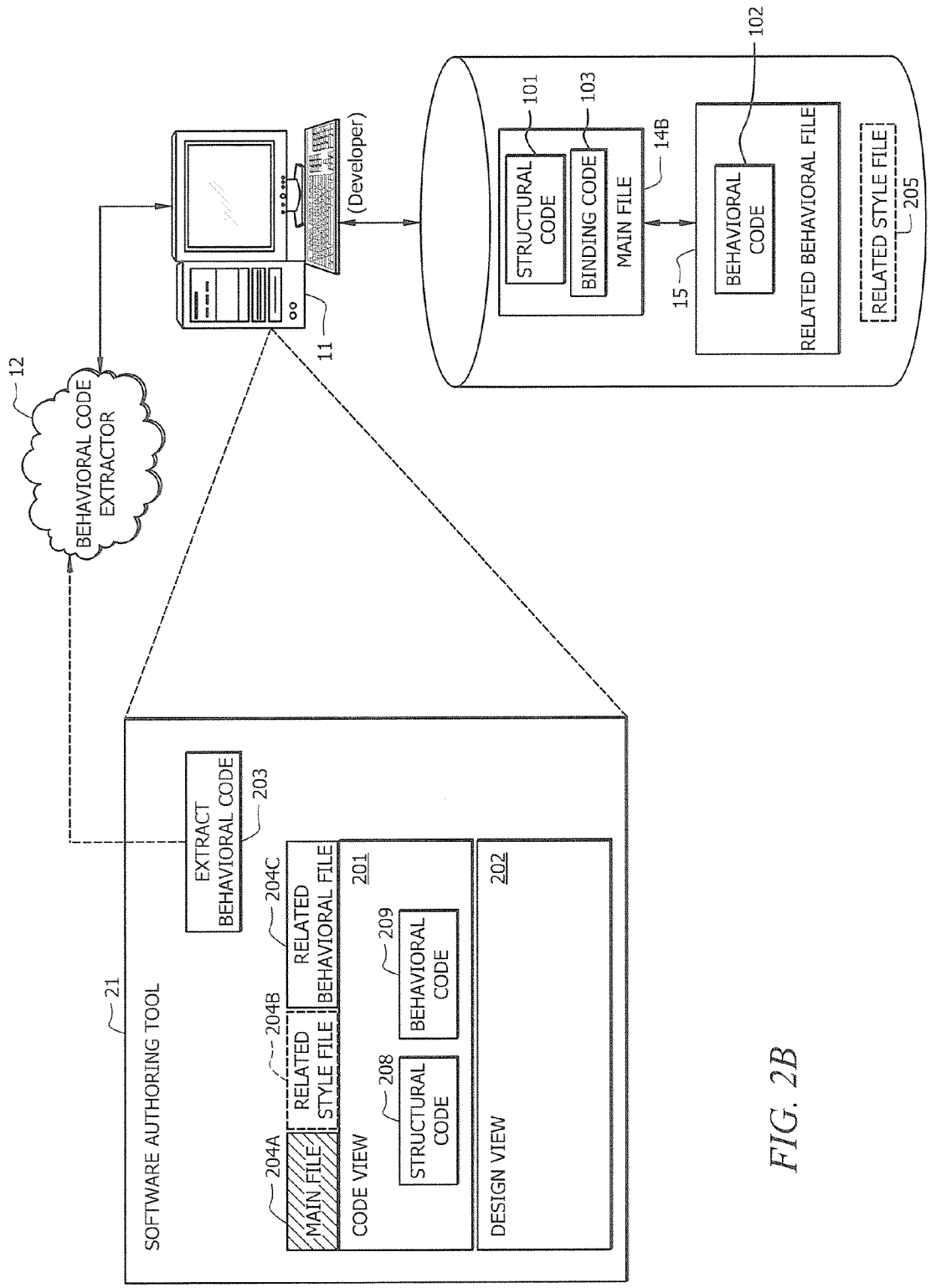
Figure 2C:
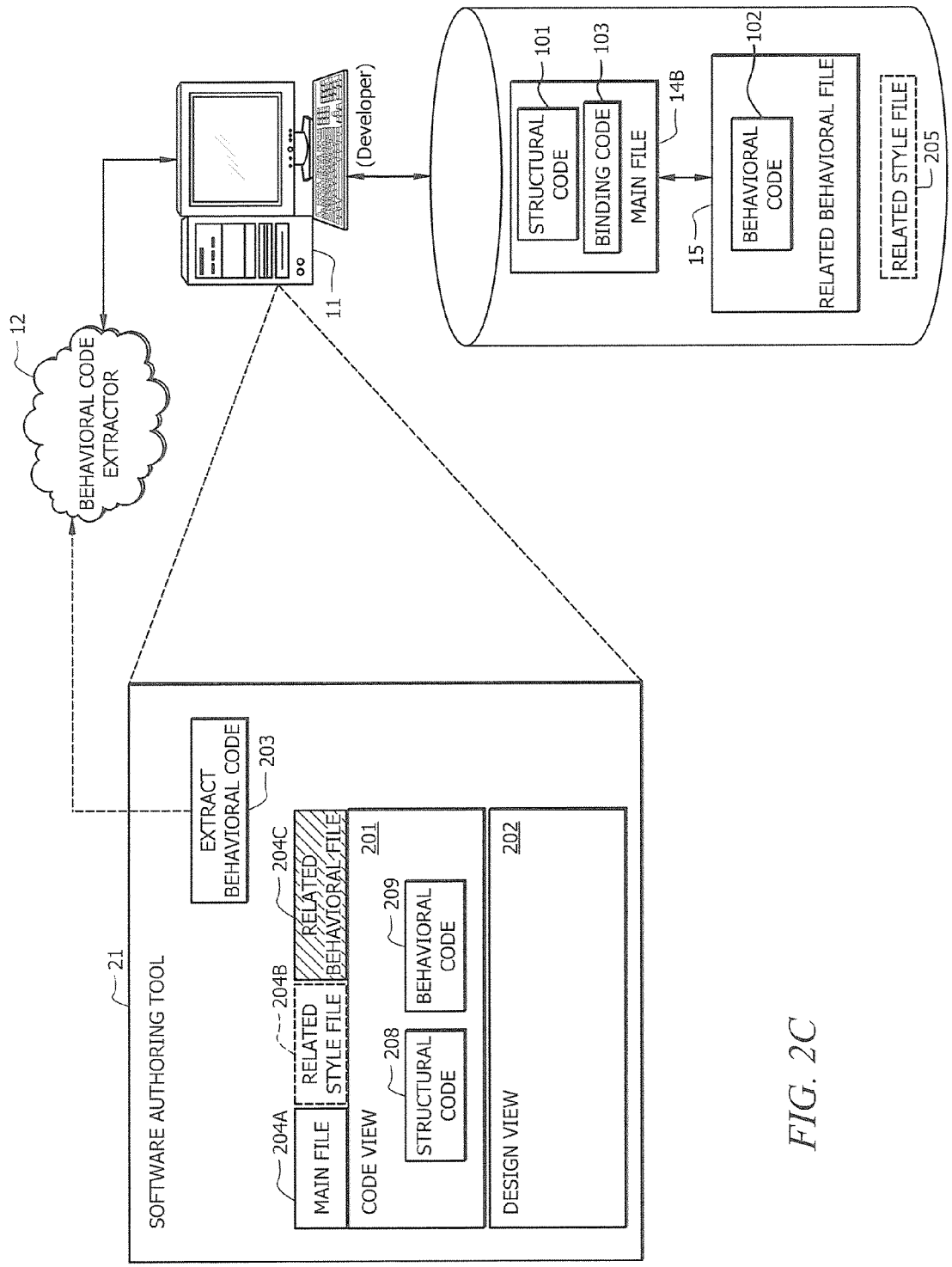

FIGS. 2A-2C show an exemplary use case scenario that is illustrative of application of behavioral code extractor 12 according to one embodiment. As in the above example of FIG. 1, a processor-based computer 11, such as a personal computer (PC), laptop computer, server computer, workstation computer, etc., is provided on which a software authoring tool (e.g., web authoring application) 21 is executing in this example. Software authoring tool 21 is operable to present one or more user interfaces with which a user (e.g., designer) may interact to author a document, such as the software source code file 14A, that defines operation of a run-time program (such as an output presentation and functionality of a run-time web page when the source code file is read/interpreted by a client browser).

In this example, software authoring tool 21 presents a code view interface 201 and a design view (or "display view") interface 202. Authoring tool 21 may employ technology similar to that employed by browsers to read a code document (e.g., of code view 201) and display in design view 202 the corresponding page that is generated from such code. Accordingly, such design view 202 may provide developers the ability to view and edit a web page in a visual mode in which the underlying source code (e.g., HTML code, XML code, CSS code, etc.) has been rendered, as if on a web browser. While the developer works on the rendered objects, the authoring tool 21 may translate and effect those changes in the underlying textual code document. Thus, design view 202 provides a design-time view of the output presentation of a web page being authored, which mimics a run-time view of the output presentation that would be presented for such web page by a browser. Such a design view 202 is a known interface that is available in certain development tools, such as in DREAMWEAVER®, available from Adobe Systems Incorporated.

In contrast, code view 201 provides a simple text editor in which the actual textual source code (e.g., HTML code, XML code, CSS code, etc.) defining a page to be generated is displayed to the user. Thus, code view 201 shows the textual code that defines the page to be generated when such code is read/interpreted (e.g., by a browser), while design view 202 shows the resulting generated page that is rendered when the underlying code is read/interpreted (e.g., by a browser).

As discussed above, web pages are commonly authored that comprise a main file e.g., a main HTML file) with many related files, such as external JS, CSS, XML, and/or other server-side files, such as other HTML files, ColdFusion Markup Language (CFML) files, PHP files, or active server pages (ASP) files. Such files may be referred to herein as "source files", as they are used together by an interpreting application, such as a browser, to build/generate an output presentation document. In the illustrated example of FIG. 2A, a main file 14A and one or more related files, such as related stylistic file (e.g., CSS file) 205 stored to data storage 13A, are authored, which together provide source files that are used for generating a run-time output presentation and functionality of the program (e.g., when the source files are interpreted by an interpreter, such as by a browser).

In this example, software authoring tool 21 discovers the related files for a software program (e.g., web page) that is being authored, and the software authoring tool 21 presents a visual indication, such as tabs 204A-204B of the discovered related files in a user interface. In this way, the user can easily see the related files that exist for the program (e.g., web page) being authored, and the user can readily access any of the related files by interacting with the corresponding visual indication (e.g., clicking a pointing device, such as a mouse, on the visual indication). For instance, in response to a user selection of the tab 204A, the textual code of the main file 14A is presented in the code view window 201, and in response to a user selection of the tab 204B, the textual code of the related style file (e.g., CSS file) 205 is presented in the code view window 201.

In the illustrated example of FIG. 2A, the tab 204A for main file 14A is selected, and thus the textual code of main file 14A is presented in code view 201. Main file 14A comprises both structural code 101 and behavioral code 102. Thus, the textual code presented in code view window 201 includes presentation of the textual code 206 corresponding to the structural code 101, as well as presentation of the textual code 207 corresponding to the behavioral code 102. It will be recognized by those of ordinary skill in the art that while the presentation of the structural code 206 and the presentation of the behavioral code 207 are illustrated as separate blocks within code view 201 in FIG. 2A, in actuality the structural and behavioral code may be interleaved with each other within main file 14A. For instance, code defining various structural portions of a run-time program may have intermingled therein code defining various behaviors of the run-time program.

In the illustrated example, a user interface is provided by software authoring tool 21 for triggering behavioral code extractor 12. For instance, a button 203 to "Extract Behavioral Code" may be provided by software authoring tool 21. Of course, in addition to or instead of such a button, any other suitable user interface for receiving a user request for extracting behavioral code may be provided, such as a menu option, hot-key sequence, etc. In response to a user activating (e.g., clicking a pointer device, such as a mouse on) the button 203 (or otherwise inputting a request to extract behavioral code), behavioral code extractor 12 accesses the existing software source code file 14A being authored in the software authoring tool 21 and extracts, from the software source code file 14A, at least a portion of the behavioral code 102 into a separate file.

For instance, as illustrated in FIG. 2B, behavioral code extractor 12 may extract behavioral code 102 from software source code file 14A, thus resulting in software source code file 14B having the behavioral code 102 extracted therefrom. Behavioral code extractor 12 places the extracted behavioral code 102 into a separate file 15 that is also stored to data storage 13A in this example.

Additionally, behavioral code extractor 12 inserts, into the software source code file 14B, binding code 103 for referencing the extracted behavioral code 102 to maintain run-time behavior of the software source code file 14B consistent with the run-time behavior of software source code file 14A before the extracting of behavior code 102.

While many examples described herein refer to the binding code as being inserted into the software source code file 14B, those of ordinary skill in the art will recognize that such binding may be achieved in other ways in some instances, and any such other binding techniques may be employed and are intended to be within the scope of the concepts described herein. For instance, in some systems (not necessarily an HTML document within a browser) a third file may be used to aggregate display and behavior. In such a case, a binding does not need to be inserted into the original document that contains the display markup (such as the binding code 103 inserted into file 14B in the above example), since the third file preserves/specifies the relationship between the two files 14B and 15. In other words, in some instances, binding code 103 may not be inserted into file 14B, but instead a third file may be created and employed for aggregating/binding the structural code file 14B and the behavioral code file 15. Thus, as referred to generally herein, "binding" (unless expressly designated as a particular type of binding technique) encompasses any technique for aggregating or binding the separated structural code file 14B and the behavioral code file 15 together.

As an example, suppose there exists a display markup file "A" and behavior code in file "B"; in this instance, a third file "C" can have within it instructions that specify to use file "A" and attach behaviors from file "B" to the elements described in file "A". An example of the use of such a third file is ADOBE AIR™, which uses a third file called "application-.xml" which has inside it the instructions that tell the AIR application what is the initial file to use for display markup, and specifies various other behavior properties for its main window. One of ordinary skill in the art will appreciate that this type of mechanism could be employed for specifying the extracted behavior file to apply to the initial file to display.

In the illustrated example of FIG. 2B, an additional tab 204C is added to the user interface of the software authoring tool 21 to identify the newly-created, related behavioral code file 15. In the example of FIG. 2B, the tab 204A is selected, which now corresponds to the main file 14B having the behavioral code 102 extracted therefrom and having the binding code 103 added therein. Thus, the textual code of main file 14B is presented in code view 201, Main file 14B now comprises structural code 101 and binding code 103, but has had the behavioral code 102 extracted therefrom. Accordingly, the textual code presented in code view window 201 includes presentation of the textual code 208 corresponding to the structural code 101 of main file 14B, as well as presentation of the textual code 209 corresponding to the binding code 103. Again, it will be recognized by those of ordinary skill in the art that while the presentation of the structural code 208 and the presentation of the binding code 209 are illustrated as separate blocks within code view 201 in FIG. 2B, in actuality the structural and binding code may be interleaved with each other within main file 14B. It should be appreciated that the modified main file 14B, having the behavioral code 102 extracted therefrom, gains the benefits of separation of structure from behavior, including enabling the designer to more easily analyze and work with the structure of the program, as defined by the structural code 101 of main file 14B.

As shown in the illustrated example of FIG. 2C, the developer may select tab 204C, which identifies the newly-created, related behavioral code file 15. In response to such selection, the textual code of behavioral code file 15 is presented in code view 201. Accordingly, the textual code presented in code view window 201 includes presentation of the textual code 210 corresponding to the behavioral code 102 that was extracted from the main file 14A. Again, it should be appreciated that the developer thus easily gains the benefits of separation of structure from behavior, including enabling the developer to more easily analyze and work with the behavioral code 102 of the program.

While an exemplary user interface implementation is illustrated in FIGS. 2A-2C (e.g., which utilizes tabs for identifying related files), it should be understood that the concepts presented herein for behavioral code extraction are not limited in any way to a particular user interface implementation. In addition, it should be understood that the behavioral code extractor 12 may be implemented within a software code authoring tool (e.g., an IDE), or as a separately-executable tool, such as a command-line tool. In addition, in certain embodiments, the behavioral code extractor 12 may be offered as a service on a network, such as the Internet. For example, in one embodiment a web service page may be hosted on a website, such as on the www.adobe.com website, that allows developers to access the behavioral code extractor 12. For instance, a developer may, via the web service page, input a URL (or other identifier) of their page, and the behavioral code extractor 12 will perform the behavioral code extraction for such page in the manner described herein. The behavioral code extractor 12 may perform its tasks on the server side (e.g., on the hosting web server) or it may be downloaded to the client and executed locally on the client, or a combination of server-side and client-side execution may be employed. The resulting structural code file (e.g., file 14B of FIG. 1) and the resulting behavioral code file (e.g., file 15 of FIG. 1) may be presented to the developer and made available for download from the hosting web server to the developer's local client-device. In this manner, in certain embodiments the behavioral code extractor 12 may be implemented as "Software as a Service".

Figure 3:
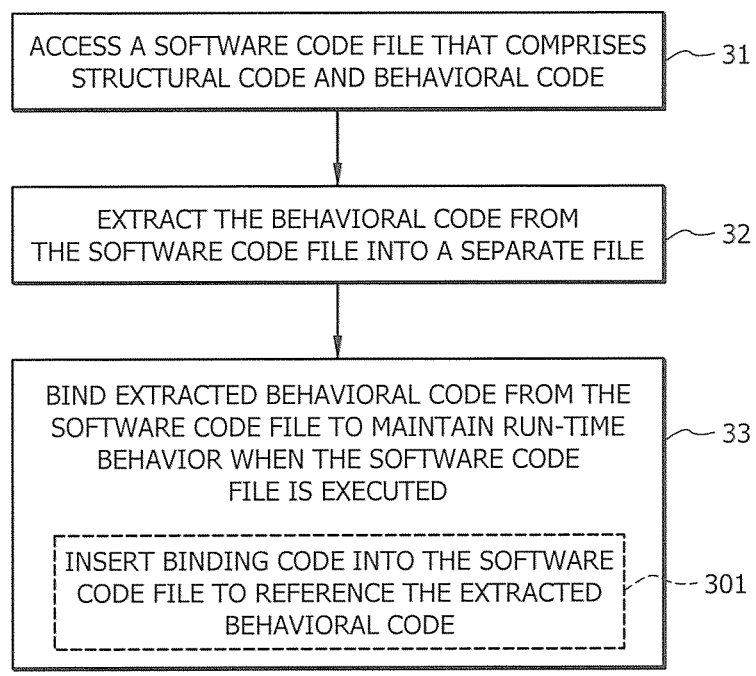
FIG. 3 shows an operational flow diagram of the behavioral code extractor according to one embodiment.

Turning now to FIG. 3, an operational flow diagram of the behavioral code extractor 12 according to one embodiment is shown. In operational block 31, behavioral code extractor 12 accesses a software source code file 14A that comprises structural code 101 and behavioral code 102. In operational block 32, behavioral code extractor 12 extracts the behavioral code 102 from the software source code file 14A (thus resulting in modified software source code file 14B) into a separate file 15. Various exemplary techniques for identifying and extracting behavioral code 102 from a software source code file according to one embodiment are described further herein below.

In operational block 33, behavioral code extractor 12 binds the extracted behavioral code 102 to the software source code file 14B to maintain run-time behavior when the software source code file 14B is executed by a processor-based device. In certain embodiments, as shown in optional dashed block 301, the behavioral code extractor 12 inserts binding code 103 into the software source code file 14B to reference the extracted behavioral code 102. As discussed above, in other embodiments the binding of the extracted behavioral code file with the software source code file may be achieved in other ways, such as through the use of a separate binding/aggregating file. The binding code 103 may cause the software source code file 14B to call the extracted behavioral code 102 (e.g., to call an appropriate portion of the extracted behavior code) when a desired behavior is to be provided during run-time of the program. Exemplary techniques for so binding/attaching the extracted behavioral code to the software source code file 14B according to certain embodiments are described further herein below.

In one embodiment, upon instantiation, the behavioral code extractor 1 traverses through the source code document 14A searching for elements and attributes that add behaviors to the document, adding them to a list of proposed items for extraction. For HTML documents, these are typically <script> blocks that contain code in-line within the document, and attributes such as "onclick", "onmouseover", etc., that trigger JavaScript functions that perform the behavior/action.

In certain embodiments, the behavioral code extractor 12 also understands that certain frameworks or libraries use proprietary namespaced attributes or tags within a source code document 14A, which get programmatically converted into behaviors at run-time within a browser, and so the behavioral code extractor 12 includes these proprietary tags and attributes within the list of proposed items to extract.

In certain embodiments, the behavioral code extractor 12 then presents, in a user interface (such as a user interface of a software authoring tool 21), the list of proposed items for extraction. The user thus has the ability to decide whether a given behavior item should be extracted from the source code document 14A. In one embodiment, not all items within the list are extracted by default. For instance, in one embodiment, the behavioral code extractor 12 automatically determines which items are safe to extract based on a set of rules and heuristics that try to limit the potential of breaking the source code document's run-time behaviors. Thus, the behavioral code extractor 12 may present the list of proposed items/edits to the user in a manner that allows the user to just hit the "OK" button to perform the extraction and still have a run-time page that works just as it did before the extraction.

Once the user hits the "OK" button on the user interface, the extraction is performed based on the items that are checked within the proposed list. The behavioral code extractor 12 will then generate JavaScript code that unobtrusively attaches the behaviors and runs the JavaScript code that was previously embedded within <script> tags in the source code document.

The behavioral code extractor 12 then adds a reference (e.g., binding code 103) to the generated JavaScript code in the source code document, and strips out all behavioral code (e.g., <script> code, behavioral elements and event attributes) that have been externalized from the source code document.

Further details regarding one exemplary embodiment of the behavioral code extractor 12 are now described for illustrative purposes, with reference to FIGS. 4A-4F. According to this exemplary embodiment, the behavioral code extractor 12 extracts all behavioral code 102 (e.g., JavaScript from the head and any event handler attributes) from an HTML source code document 14A and places such extracted behavioral code 102 in an external file (e.g., behavioral code file 15), attaching the event handlers unobtrusively. All extracted JavaScript will continue to work as before, including any DREAMWEAVER (or other software authoring tool) behaviors.

According to one exemplary embodiment, users can access/trigger the behavioral code extractor 12 feature via the Commands menu (e.g., Commands>Externalize JavaScript) of the software authoring tool 21 (e.g., DREAMWEAVER). The software authoring tool (e.g., DREAMWEAVER in this example) inspects the current source code document 14A that is being authored therein, and displays the list of <script> blocks and attributes that can be extracted from the current source code document 14A in the main command dialog 404, as shown in FIG. 4A.

The main command dialog 404, in this example, has a few controls with which a user may interact to manage the extraction of the listed behavioral code items from the source code document 14A. An "OK" button 405, when activated by the user, causes behavior code extractor 12 to execute the extraction command in accordance with the proposed edits shown at that time in the main command dialog 404. Only edits that are checked within the list 406 of proposed edits will be applied. Upon completion of the extraction command, a summary dialog 407 may be displayed to let the user know what edits were applied, such as shown in FIG. 4B.

Figure 4A:
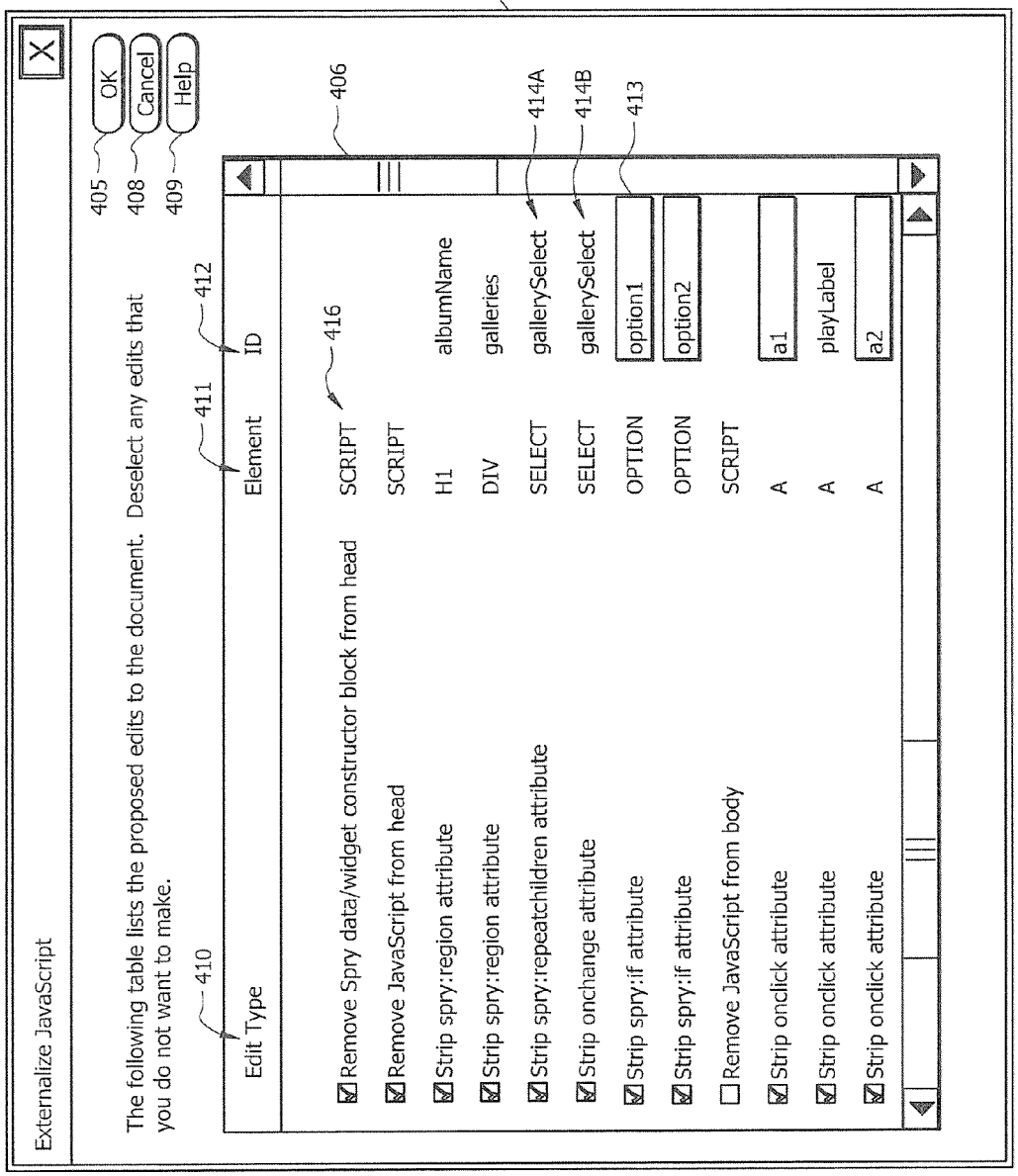
FIGS. 4A-4F show exemplary user interfaces according to one exemplary embodiment of the behavioral code extractor.
Figure 4B:
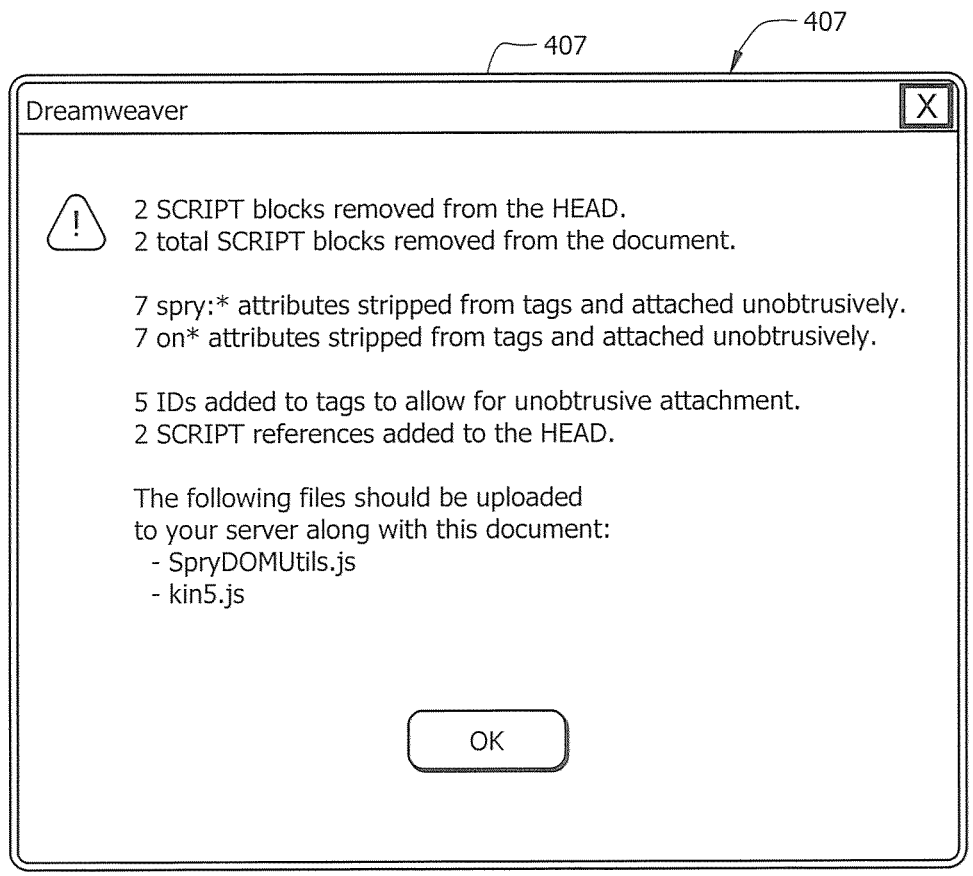

Returning attention to the main command dialog 404 of FIG. 4A, a "Cancel" button 408 is also provided that, when activated by the user, cancels the extraction command and dismisses the main dialog 404. No edits are performed by the behavior code extractor 12 in response to the activation of cancel button 408. A "Help" button 409 is also provided in this example that, when activated by a user, displays help for the Externalize Behavioral Code command.

A list 406 of proposed edits (or proposed extractions) is also provided in the main command dialog 404. List 406, in this example, includes 3 columns of information for each behavioral item listed. First, the Edit Type column 410 identifies the type of behavioral item of the corresponding behavioral item identified in the list. Next, the Element column 411 identifies the element that contains the corresponding behavioral item exists, such as a Script element or a "div" element, within the source code document 14A. Finally, the ID column 412 provides the value of the ID (identifier) attribute of the element that contains the attribute.

The ID column 412, in this exemplary embodiment, utilizes an ID, such as a user-specified name, of an element. In certain embodiments, this may be expanded to other ways of identifying an element within the document that could be based, as examples, on other attribute values, position within the document, ancestral or sibling context, tag name, etc., which may enable the same extracted behavior to be applied to multiple elements within the document.

Thus, it should be recognized that the behavioral code extractor may utilize an identifier (such as that of the ID column 412) so that it can attach behaviors during the runtime. One such identifier is the value of the ID attribute on the element, but other identifiers may likewise be used, such as a CSS Selector or XPath, to identify an element or group of elements based on other attribute values, position within the document, ancestral/sibling/behavioral context, element names, etc. These identifiers can be automatically calculated/generated by the behavioral code extractor and either automatically used or presented to the user so that the user can decide whether to use those generated IDs or modify/specify their own IDs.

Additionally, each item in list 406 has associated therewith a corresponding checkbox that determines whether or not the edit will be applied when the extraction command is executed by the behavioral code extractor 12. If checked, the edit will be applied by behavioral code extractor 12 when the "OK" button 405 is pressed. If not checked, the edit is ignored by the behavioral code extractor 12 when the "OK" button 405 is pressed.

In this exemplary embodiment, the initial/default state of the checkbox for a given edit item is determined using a set of heuristics. In one exemplary embodiment, such initial/default state is determined based at least in part on whether the edits that affect <script> blocks in the head of the source code document 14A contain document.write( ) or document.writeln( ) calls.

In addition, in certain embodiments, all edits that affect event handler or spry attributes are checked by default. And, all edits that affect the <script> blocks in the body of the document are unchecked by default, unless DREAM-WEAVER determines that the block contains only Spry widget or data set constructors.

For attribute edits, the item will also display, in its column 412, the value of the ID attribute of the element that contains the attribute. If the element does NOT have an ID attribute, the item will display a text field with a suggested ID value, such as the exemplary text field 413 of FIG. 4A, to give the user a chance to specify an ID value of their own.

Edits that affect the same node are grouped together in this exemplary embodiment, and alternating bands of color are preferably used to aid the user in distinguishing different nodes. For example, in the screenshot of FIG. 4A, the two edits 414A and 414B that affect the SELECT with the ID of gallerySelect are arranged together, both having the same color band.

Figure 4C:
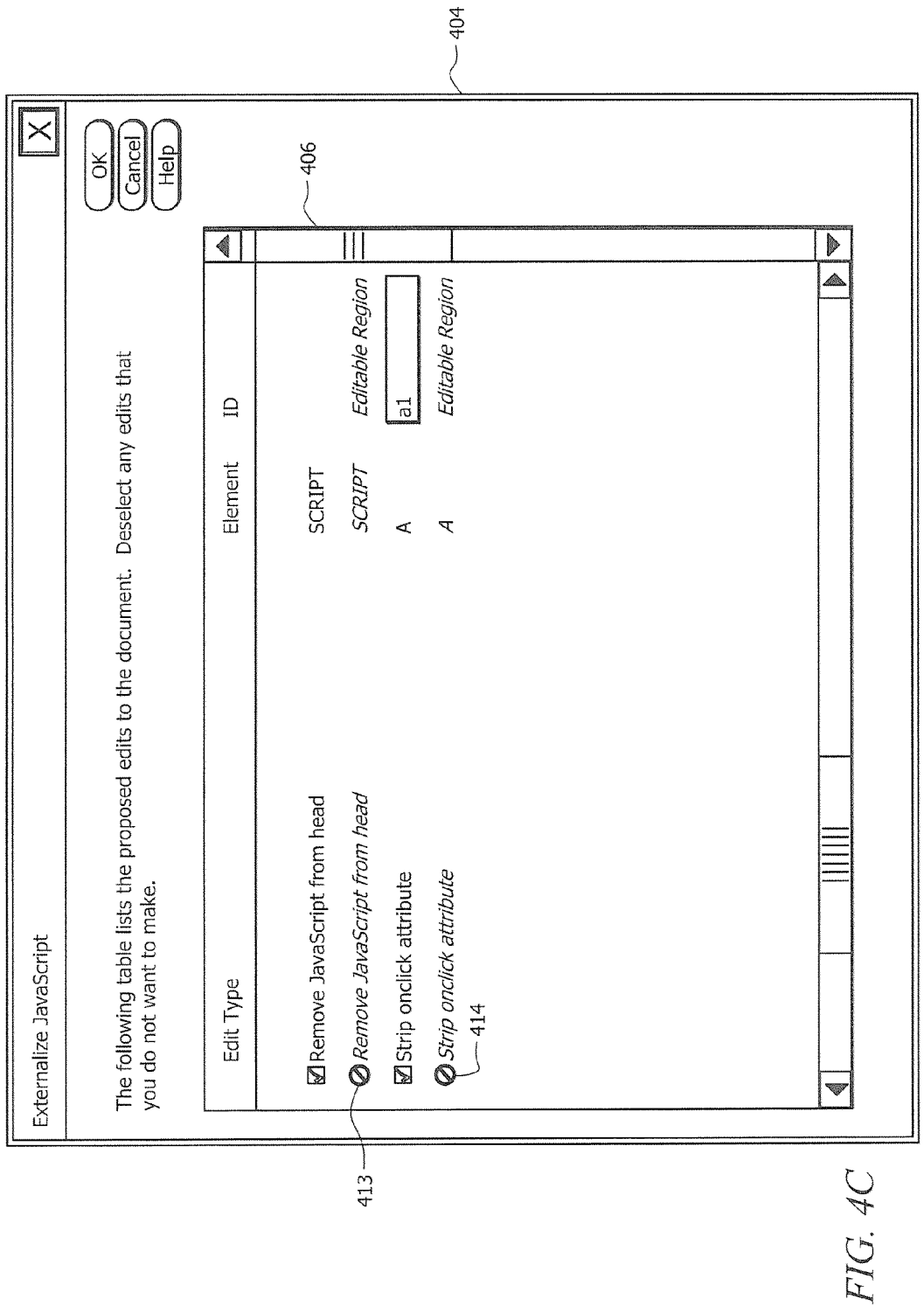

For informational purposes, DREAMWEAVER may also display edit items for <script> and attributes that are contained within locked regions of the document, such as edits 416 and 417 that are shown in list 406 of FIG. 4C. For these edit items, a red slash 413 and 414 may be displayed, instead of a checkbox, to inform the user that the edit is prohibited. A message may also be displayed in a that tells the user why that edit is not allowed.

In one embodiment, user edits are not allowed for items that are in:
  a) Template Editable regions within .dwt file;
  b) Non-Editable regions within Template Instance files; and
  c) Library Items.

Figure 4D:
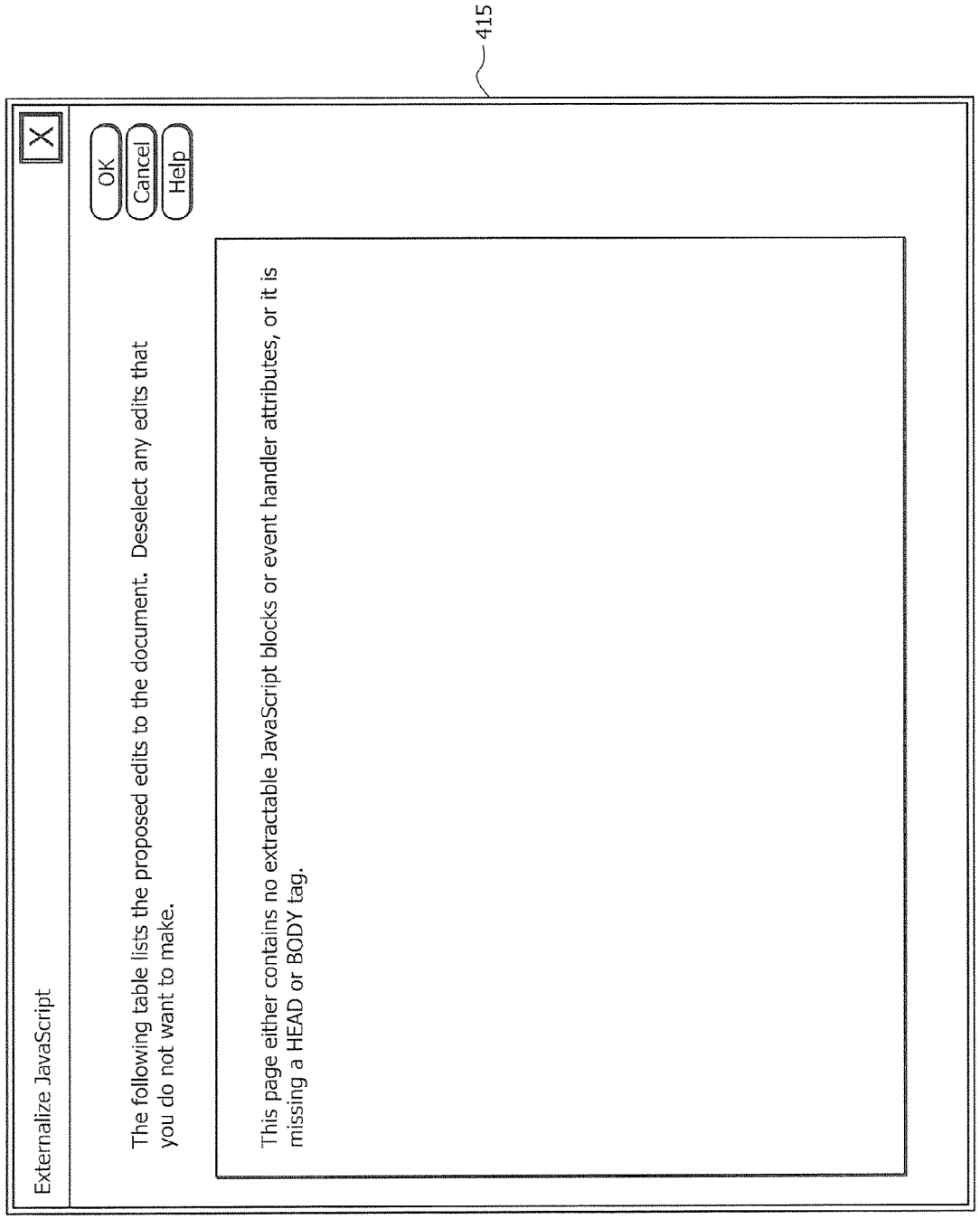

If the document contains no <script>, event or spry attributes, the main command dialog 404 will appear with a message 415, such as shown in FIG. 4D, which informs the user that the page either contains no extractable behavioral code or it is missing a HEAD or BODY tag.

According to one embodiment, the extraction process employed by the behavioral code extractor 12 starts with identifying 3 basic items in the source code document 14A:
  1) Inline <script> blocks in the <head>;
  2) Inline <script> blocks in the <body>; and
  3) on* event and spry:* attributes.

Regarding, the Inline <script> blocks in the <head>, the behavioral code extractor 12 employs the following extraction technique in one embodiment. Because inline <script> blocks in the <head> execute immediately as the file is loaded and before any <body> content is present, it is generally safe to simply move the entire contents of the script block into the generated extraction file 15 so that it gets executed immediately at the point in the file the extraction file is included within the HTML document. According to one embodiment, this type of edit is made by default.

One consideration that may be desirable to take into account, whether behavioral code extraction is being performed manually or by code extraction logic, is that by moving all of the inline <script> blocks in the <head> into a single extraction file, some will potentially lose their place within the document. If an inline <script> block was strategically placed at a specific point in the document to affect something else after it, something may be broken. Thus, this issue may be taken into consideration in the implementation of the behavioral code extractor in certain embodiments to ensure robustness of the resulting code.

Inline scripts in the body are generally used for immediate manipulation of markup that precedes the <script> block. Because of this, the code is externalized (in behavioral code file 15) within the <script> block in a manner such that it can be triggered "after" all of the initial markup in the document has been loaded. According to one embodiment, these types of edits are not made by default. Users will be able to specify (e.g., by selecting the checkboxes of command dialog 404, that they "do" want to make an edit of this type if they so choose. According to one embodiment, Spry widget constructors are identified in <script> blocks in the <body>, and they may be externalized by behavioral code extractor 12 (e.g., into behavioral code file 15) in the manner described above.

Further issues that may be desirable to take into consideration by the heuristics employed by the behavioral code extractor in certain embodiments are discussed hereafter. First, script blocks can use document.write( ) to dynamically write out additional markup. This may be problematic if the behavioral code extractor 12 triggers the inline script "after" the document's onload handler is triggered because document.write( ) "appends" to the document "before" the onload event fires, but then "replaces" the entire content of the document if called "after" the onload event tires. It may not be easy to detect if a script block triggers a document.write( ), especially since the script block may call some function in an external file which executes a document.write( ). An example of this would be the EOLAS Flash code that Dreamweaver and other Adobe products insert.

Global variables may present another issue to take into consideration in certain embodiments of the behavioral code extractor. Some script blocks declare or manipulate global variables. Thus, it may be undesirable for the behavioral code extractor 12 to just take the code within the script block and place it in a function that is triggered from an onload event handler, since the code could contain var keywords that could change the scope of the variable when within a function. As an example, consider the following code:

```
<body>
...
<input type="button" value="Do It" onclick="if (gMyGlobalVariable) alert('foobar');"/>
<script type="text/javascript">
... var gMyGlobalVariable=true;
...
</script>
...
</body>
```

Thus, it may be desirable to parse the code for global variables and generate code that forward declares them in a global scope, and remove the var keywords before placing the code in a function. Care should be taken to parse the JS to correctly identify the global variables. In one embodiment, the Spider-Monkey JavaScript interpreter that is embedded within DREAM WEAVER may be leveraged to do the actual parsing, and new Extension API calls may be added to allow for this operation. Another potential workaround is to string'ify the script content and add code to the onload handler that dynamically inserts a <script> tag in the head and executes the string within the global context. This potential workaround may be less desirable because the string'ification will add all sorts of escape characters, etc. to the code.

Developers sometime place <script> blocks inside Spry regions/detailregions so that they get executed anytime the region gets regenerated. To make this work properly, the behavioral code extractor 12, according to one embodiment, generates code that executes this code from within a region observer. This may not only run into the "Global Variables" issue mentioned above, but if the script code in question makes use of data references, the code may not execute properly. Also, in order to attach an observer to the region that contains the <script> block, the element that has the spry:region or spry:detailregion must have an ID attribute on it. If it does not, the behavioral code extractor 12 may need to add one. For instance, consider the following example of markup in the source code document 14A:

```
<div id="region1" spry:region="dsProducts">
...
<div id="Accordion1" class="Accordion">
...
</div>
<script type="text/javascript">
var Accordion1=new Spry.Widget.Accordion("Accordion1");
</script>
...
</div>
```

Then, suppose the behavioral code extractor 12 of one embodiment runs, generating the following output of behavioral code (for behavioral code file 15):

```
Spry.Data.Region.addObserver("region1", {on PostUpdate: function( ) {Accordion1=new Spry.Widget.Accordion("Accordion1");}});
Spry.Utils.addLoadListener(function( )
{
Spry.$$("#region1").setAttribute("spry:region", "dsProducts");
});
```

The behavioral code extractor 12 of one embodiment scans all <script> blocks, in either the <head> or <body>, in an attempt to identify "Spry Constructor Blocks". A Spry Constructor Block is a <script> block that contains "ONLY" Spry data set or widget constructor calls. If it finds one, the <script> block is tagged as a constructor block within the list control and the default state for that <script> block will be checked so that it can be extracted, as shown for item 416 in FIG. 4A. For instance, in the exemplary screen shot of FIG. 4A, the first <script> block in the <head> has been identified (e.g., in item 416) as a Spry constructor block. It does not matter if the constructor block is in the <head> or the <body>, its default state will be checked, by default, for extraction. This is because the behavioral code extractor 12 knows it is safe to extract these constructors and modify them so that they can be executed unobtrusively.

The general rule for "on" attributes, according to one embodiment of the behavioral code extractor 12, is that it is desirable to externalize them in a manner that converts them to their unobtrusive equivalent. For example, the code:

```
<a id="nextLink" href="myapp.php?action=next" onclick="LoadNextSet( ); return false;">Next</a>
``` becomes

```
<a id="nextLink" href="myapp.php?action=next">Next</a>
```

And, the extraction code that gets generated by behavioral code extractor 12 in one embodiment is:

```
Spry.Utils.addLoadListener(function( )
{
Spry.$$("#nextLink").addEventListener("click", function (e) {LoadNextSet( ); false;}, false);
});
```

An exception to this, in one embodiment, is for "on" attributes that are inside a spry:region or spry:detail region. According to one embodiment, such "on" attributes that are inside a region are placed back on the corresponding element as an attribute to make it so that the behavioral code extractor 12 does not have to generate observer code that unobtrusively attaches click handlers everytime the region is re-generated. For example, consider the following code:

```
<div id="productList" spry:region="dsProducts">
<ul>
<li spry:repeat="dsProducts" onclick="SelectProduct( );">{name}</li>
</ul>
</div>
``` which becomes

```
<div id="productList">
<ul>
<li id="li1">{name}</li>
</ul>
</div>
```

And, the extraction code that gets generated by the behavioral code extractor according to one embodiment is:

```
Spry.Utils.addLoadListener(function( )
{
Spry.$$("#productList").setAttribute("spry:region", "dsProducts");
Spry.$$("#li1").setAttribute("spry:repeat", "dsProducts");
Spry.$$("#li1").setAttribute("onclick", "SelectProduct( );");
});
```

For "spry:" attributes, the behavioral code extractor generates extraction code that places the attribute back on the element, as in the example above. According to one embodiment, the behavioral code extractor 12 makes "spry:" and "on" attribute edits by default.

Another potential problem to take into consideration regards onload Attributes. Onload attributes are tricky to deal with because they can be placed on other elements aside from the <body> element, specifically <img> elements. So, the behavioral code extractor 12 may not just unobtrusively attach onload handlers or attributes to elements from the extraction file because most of the unobtrusive attachment happens from within a function that is triggered itself from an onload handler. One solution would be to attach the unload attribute/handlers prior to the onload event firing, but unfortunately a DOMReady notification is not supported by all browsers. Some frameworks have resorted to using hacks, but even though they work in today's browser, they are very prone to error in future browser versions. Accordingly, another solution that may be employed is to execute the onload code for a given element from within the extraction file's onload handler.

Another potential issue that may be desired to have the behavioral code extractor take into consideration regards adding of missing ID attributes to elements in a Spry region. In one embodiment, any element from which the behavioral code extractor 12 extracts an "on" or "spry:" attribute has an ID attribute defined. This is so that the code the behavioral code extractor 12 generates can dynamically locate the element and attach the attribute. For elements that are missing ID attributes, the behavioral code extractor 12, according to one embodiment, generates an ID and then adds it as an ID attribute on the element. A potential issue with this scenario to take into consideration is that the element in question may be inside a spry:repeat or spry:repeatchildren processing instruction, so when the region is processed in the browser, Spry may generate many elements, each of which have the exact same ID. As an example, consider the following initial markup:

<div spry:region="dsProducts">
...
<li spry:repeat="dsProducts" onclick="alert('{name}');'>{name}</li>
...
</div>The extraction process would result in the following markup:
<div id="div1">
...
<li id="li1">{name}</li>
...
</div>

When loading the above markup in the browser at run-time, the markup will become:
<div id="div1">
...
<li id="li1" onclick="alert('Product 1');'>Product 1</li>
<li id="li1" onclick="alert('Product 2');'>Product 2</li>
<li id="li1" onclick="alert('Product 3');'>Product 3</li>
...
</div>

One solution for this issue, which is employed in one embodiment of the behavioral code extractor 12, is to go ahead and generate an ID and place it on the element as the behavioral code extractor 12 normally would, but to dynamically change the ID to a templated version "after" it has unobtrusively attached behaviors and attributes to the element. Using this solution with the previous example, would yield the following JavaScript:

Spry.$$("li1").setAttribute("spry:repeat", "dsProducts");
Spry.$$("li1").setAttribute("onclick", "alert('{name}');");
try{document.getElementById("li1")
.id="li1_{dsProducts::ds_RowID}";} catch(e) { }

Which would result in the following markup being generated:
<div id="div1">
...
<li id="li1__0" onclick="alert('Product 1');'>Product 1</li>
<li id="li1__1" onclick="alert('Product 2');'>Product 2</li>
<li id="li1__2" onclick="alert('Product 3');'>Product 3</li>
...
</div>

According to one embodiment, the extraction of script from Template (.dwt) files is identical to that of normal HTML documents, except that the extraction is only performed on <script> blocks and attributes for elements that are NOT in editable regions. The reasoning behind this, in one embodiment, is that only content that is in the non-editable region portions of the template document are shared across all instances, whereas code that is inside a template's editable region is NOT guaranteed to be present in each template instance that is derived from the template document.

Although edits within editable region are not allowed, in one embodiment, the <script> blocks and attributes within that region will still be displayed, for informational purposes only, to the user. These edit items will display a red slash instead of a checkbox to let the user know that these edits won't be allowed, such as illustrated in FIG. 4C.

In one embodiment, the generated extraction file 15 is saved in the root directory of the site, since only .dwt files can exist in the site's templates folder.

The extraction of script from Template instance files is the opposite of Templates, in one embodiment. Thus, in one embodiment, only <script> and attributes for elements that are INSIDE editable regions are externalized.

Figure 4E:
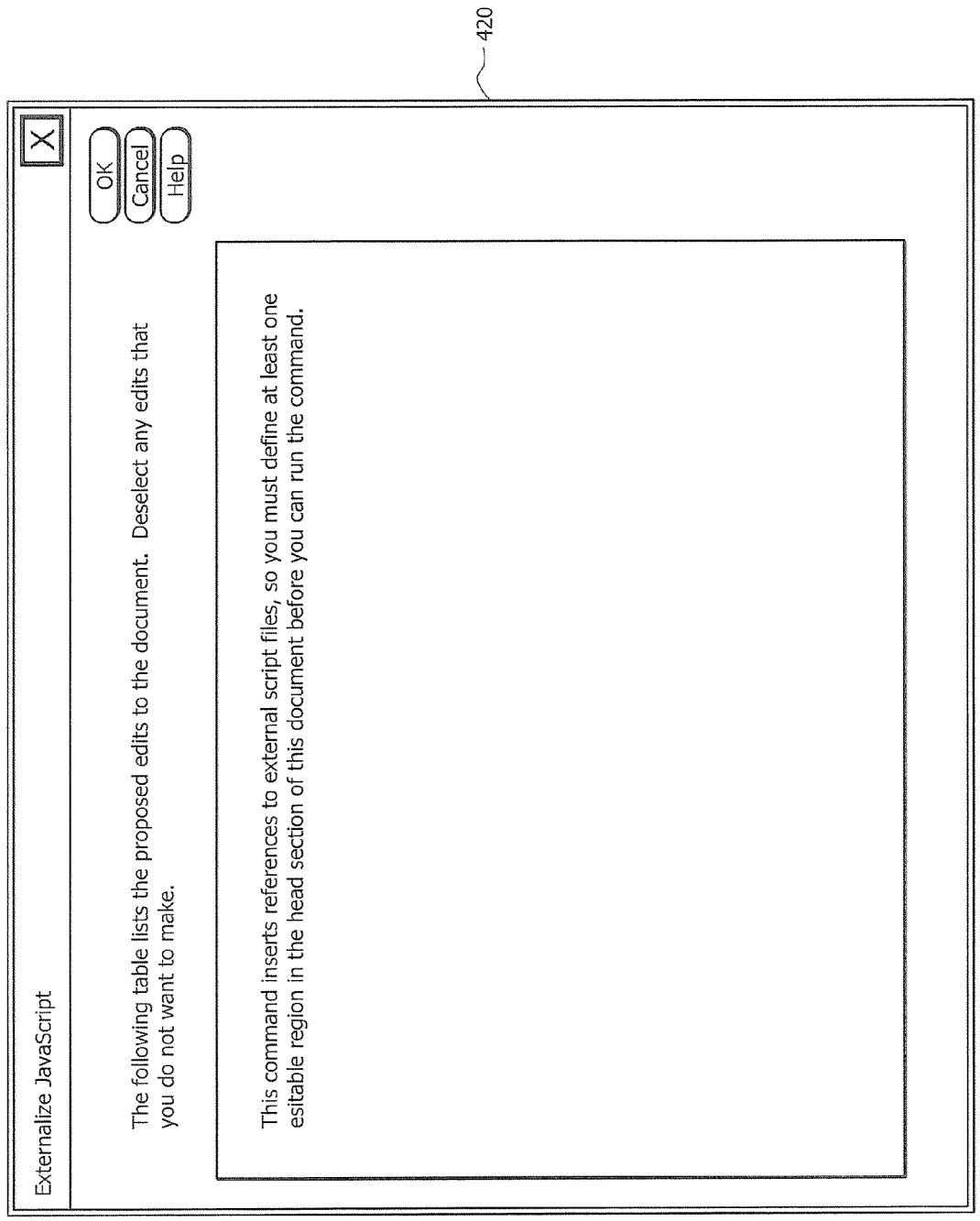
Figure 4F:
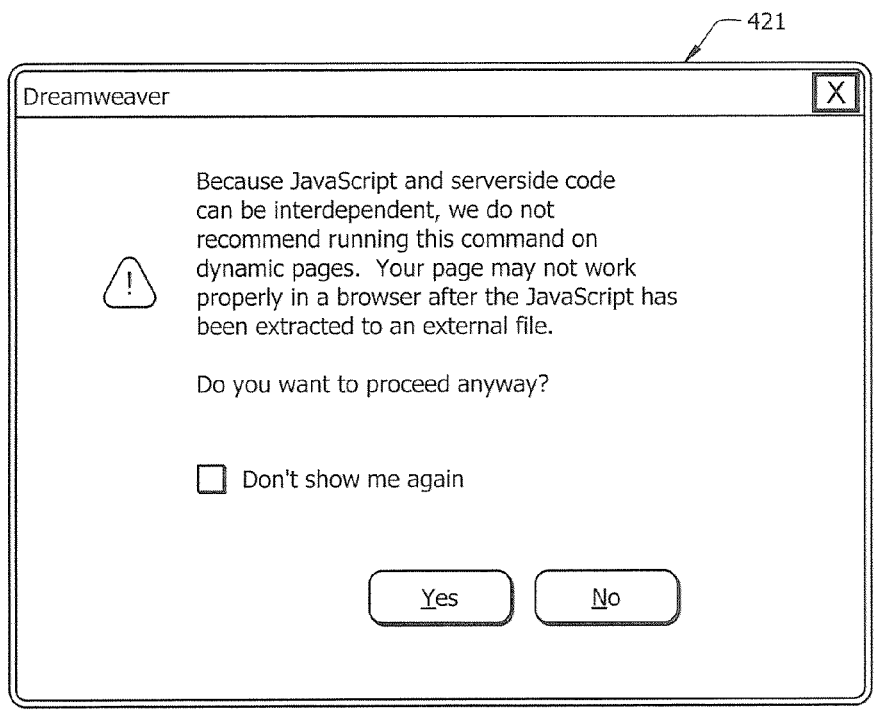

As with templates, edits that are within the non-editable regions of the document, are displayed within the list of proposed edits, for informational purposes only in one embodiment. These edit items will be displayed with a red slash instead of checkboxes:

In one embodiment, should the user instantiate the Externalize Behavioral Code command for a Template Instance file that contains no editable regions in the <head> of the document, a message 420 will be presented, such as shown in FIG. 4E, to inform the user that the command inserts references to external script files, and so the user must define at least one editable region in the head section of this document before running the command.

Library items pieces of re-useable HTML markup and/or <script> that are shared between files within a given site. DREAMWEAVER manages these library items in such a manner that if the library item (.lbi) file is modified, all files within the site are automatically updated. When editing a file that uses a library item, DREAMWEAVER treats the library item markup/code as a single unit. Users are not allowed to edit or select the markup inside the library item. It can only be edited or selected as a single unit.

Since the DOM allows traversal down into the markup/code within a library item, the Externalize Behavioral Code command, according to one embodiment, takes care to notate any <script> blocks or attributes that fall within a library item. These edits will be displayed to the user within the list of proposed edits, for informational purposes only. They will be displayed with a red slash instead of a checkbox to let the user know that these edits are informational only, and that the edits will not be made, in one embodiment.

Due to the potential complexities of a serverside script (PHP, ASP, JSP, CF, etc), certain embodiments of the behavioral code extractor 12 may not reliably extract the JavaScript from serverside script file. To do so, would require intimate knowledge and parsing of each server side language. Since only the user can determine if the Externalize Behavioral Code command will work or not on their serverside script, one embodiment warns the user of potential problems, rather than prohibiting them entirely from running the command. For instance, according to one embodiment, should a user attempt to instantiate the command for a serverside script, the command will display the dialog 421 of FIG. 4F before showing the main command dialog 404 described above.

According to one embodiment, after extraction the behavioral code extractor 12 automatically adds a binding (e.g., include of the generated behavioral code file) and a binding for any other support files (libraries) used by the generated code so that things run and behave as they did before the extraction. One example of a support file that may be included is SpryDOMUtils.js. This support document may not be necessary in the original incarnation of the source code document, but since the code generated uses utility functions to unobtrusively attach behaviors on elements, the SpryDOMUtils.js file is included in the document because that is where those utility functions are defined.

According to certain embodiments, the behavioral code extractor 12 intelligently makes recommendations on what is safe to extract (e.g., what is initially checked in the exemplary user interface of FIG. 4A). Further, in certain embodiments, the behavioral code extractor 12 intelligently modifies extracted behavioral code so that it facilitates unobtrusive attachment and is triggered at the appropriate time during the loading of the document or user interaction to yield the same run-time results as the pre-extraction file.

As an example: <div id="d1" onclick="alert('hello world');"> can be translated to <div id="d1"> in the structure file, and it can be translated to the following in the behavioral code file: Spry.$$("#d1").addEventListener("click", function( ){alert('hello world');}, false). But, it could have easily also been written out like this: Spry.$$.("#d1").setAttribute("onclick", "alert('hello world');"). Thus, the behavioral code extractor 12 may choose which of the two formats to write out based on some rules and heuristics since one form may be appropriate in most but not all cases.

An example of a re-write of behavioral code, so that it gets triggered at the appropriate time is as follows:

```
<div id="rgn1" spry:region="dsProducts">
<div id="acc1" class="Accordion">
...
</div>
<script type="text/javascript">
var acc1=new Spry.Widget.Accordion("acc1");
</script>
</div>
```

The above markup may be converted to this structured markup:

```
<div id="rgn1">
<div id="acc1" class="Accordion">
...
</div>
</div>
```

And, the following code generated:

```
Spry.Utils.addLoadListener(function( )
{
Spry.$$("#rgn1").setAttribute("spry:region", "dsProducts");
var acc1=new Spry.Widget.Accordion("acc1");
});
```

But, since the behavioral code extractor 12, according to one embodiment, has some intelligence, it knows that spry:regions are special and that it should have written the following out so that things keep working properly any time the region re-generates itself dynamically.

```
Spry.Utils.addLoadListener(function( )
{
Spry.$$("#rgn1").setAttribute("spry:region", "dsProducts");
});
Spry.Data.Region.addObserver("rgn1", {on PostUpdate: function( )
{
var acc1=new Spry.Widget.Accordion("acc1");
}});
```

Embodiments of the present invention, or portions thereof may be embodied in program or code segments operable upon a processor-based system (e.g., computer system) for performing functions and operations as described herein. The program or code segments making up the various embodiments of the present invention may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments of the present invention, or portions thereof may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 5:
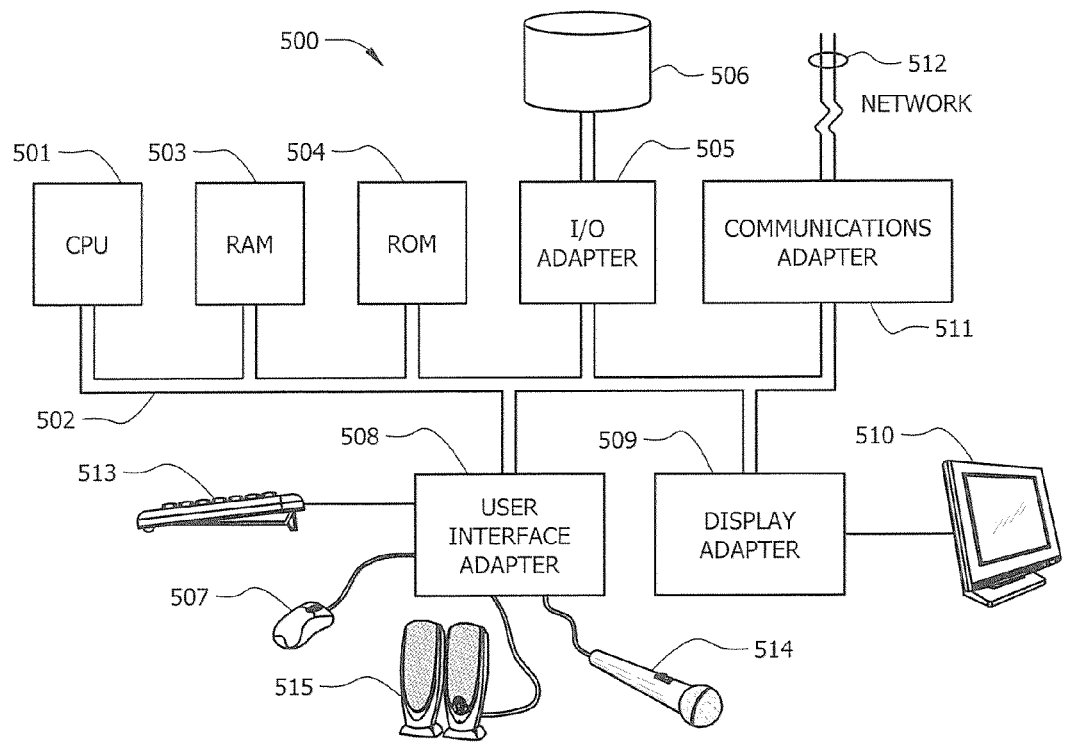
FIG. 5 shows an exemplary system on which embodiments of the behavioral code extractor and/or software authoring tool may be implemented.

FIG. 5 illustrates an exemplary computer system 500 on which behavioral code extractor 12 and/or software authoring tool 21 may be implemented according to one embodiment. Central processing unit (CPU) 501 is coupled to system bus 502. CPU 501 may be any general-purpose CPU. The present invention is not restricted by the architecture of CPU 501 (or other components of exemplary system 500) as long as CPU 501 (and other components of system 500) supports the inventive operations as described herein. CPU 501 may execute the various logical instructions according to embodiments. For example, CPU 501 may execute machine-level instructions according to the exemplary operational flow described above in conjunction with FIG. 3 and/or for performing other operations described herein as being performed by behavioral code extractor 12 and/or software authoring tool 21.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold user and system data and programs, as is well known in the art.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as interacting with a user interface of a software authoring tool 12, as described above with FIGS. 4A-4G.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing data for operations of the behavioral code extractor 12 and/or software authoring tool 21. Communications adapter 511 is preferably adapted to couple computer system 500 to network 512, which may enable information to be input to and/or output from system 500 via such network 512 (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display information pertaining to an application under development, such as design-time code view 201, design view 202, and/or the dialogs described above with FIGS. 4A-4G, etc., according to certain embodiments.

It shall be appreciated that embodiments are not limited to the architecture of system 500. For example, any suitable processor-based device may be utilized for implementing behavioral code extractor 12 and/or software authoring tool 21, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method comprising:
   accessing a software code file that comprises structural code and behavioral code;
   extracting from the software code file, at least a portion of the behavioral code into a separate file;
   generating binding code for referencing the extracted behavioral code to maintain run-time behavior of the software code file consistent with its run-time behavior before said extracting, wherein behavioral code extractor logic inserts into the software code file said binding code for referencing the extracted behavioral code; and
   wherein said extracting comprises enabling, by a user interface, selection of one or more of identified behavioral code that is to be extracted from the software code file into the separate file; and
   extracting the selected one or more of the identified behavioral code from the software code file into the separate file.

2. The method of claim 1 wherein said accessing, extracting, and generating are performed by behavioral code extractor logic.

3. The method of claim 2 wherein said behavioral code extracting logic is part of a software code authoring tool in which said software code file is being authored.

4. The method of claim 1 wherein said structural code comprises markup language code.

5. The method of claim 4 wherein said behavioral code comprises scripting language code.

6. The method of claim 5 wherein said scripting language code comprises JavaScript code.

7. The method of claim 4 wherein said behavioral code comprises event attributes defined by markup language code.

8. The method of claim 1 wherein said software code file comprises a source file for a web page.

9. The method of claim 1 wherein said extracting is responsive to a user request input to a software code authoring tool.

10. The method of claim 1 wherein said extracting comprises:
    identifying the behavioral code contained in the software code file; and
    presenting the user interface that includes a list of the identified behavioral code contained in the software code file.

11. The method of claim 1 further comprising:
    presenting the user interface that includes a list identifying one or more behavioral code to be extracted from the software code file into the separate file contained in the software code file; and
    presenting in the user interface a corresponding binding identifier for each of the one or more behavioral code to be extracted from the software code file, wherein the binding identifier is utilized within binding code for referencing the corresponding extracted behavioral code.

12. The method of claim 11 further comprising:
    enabling, by the user interface, modification of the one or more binding identifier.

13. The method of claim 1 further comprising:
    attaching the behavioral code to the software code file at run-time of the software code file.

14. Computer-executable software code stored to a non-transitory computer-readable medium, which when executed by a computer causes the computer to perform a method comprising:

receiving a request to extract behavioral code from a software code file that comprises said behavioral code and structural code;

responsive to the request, extracting from the software code file at least a portion of the behavioral code into a separate file, and generating binding code for referencing the extracted behavioral code to maintain run-time behavior of the software code file consistent with its run-time behavior before said extracting;

inserting, into the software code file, said binding code for referencing the extracted behavioral code; and wherein said extracting comprises enabling, by a user interface, selection of one or more of identified behavioral code that is to be extracted from the software code file into the separate file; and extracting the selected one or more of the identified behavioral code from the software code file into the separate file.

15. The computer-executable software code of claim 14 wherein said receiving is by a software code authoring tool in which the software code file is being authored.

16. The computer-executable software code of claim 14 wherein said extracting comprises:

identifying the behavioral code contained in the software code file; and presenting the user interface that includes a list of the identified behavioral code contained in the software code file.

17. The computer-executable software code of claim 16 further comprising:

presenting in the user interface a corresponding binding identifier for each of the one or more behavioral code to be extracted from the software code file, wherein the binding identifier is utilized within the binding code for referencing the corresponding extracted behavioral code; and enabling, by the user interface, modification of the one or more binding identifier.

18. The computer-executable software code of claim 14 wherein said structural code comprises markup language code, and wherein said behavioral code comprises at least one of scripting language code and event handler code defined in a markup language.

19. The computer-executable software code of claim 18 wherein said behavioral code comprises JavaScript code.

20. The computer-executable software code of claim 14 further comprising:

attaching the behavioral code to the software code file at run-time of the software code file.

21. A system comprising:

non-transitory computer-readable medium to which instructions are stored; and processor operable to execute said instructions that when executed by the processor causes the processor to access a web page source code file that comprises structural code and behavioral code for the web page, wherein said behavioral code comprises at least one of scripting language code and event handler code, extract, from the web page source code file, at least a portion of the behavioral code into a separate file, insert, into the web page source code file, binding code for referencing the extracted behavioral code to maintain run-time behavior of the web page consistent with its run-time behavior said extracting, and wherein a user interface enables selection of one or more of identified behavioral code that is to be extracted from the web page source code file into the separate file; and wherein the one or more of the identified behavioral code is extracted from the web page source code file into the separate file.

22. The system of claim 21 wherein when executed by the processor said instructions further cause the processor to:

identify the behavioral code contained in the web page source code file;

present the user interface that includes a list of the identified behavioral code contained in the web page source code file.

23. The system of claim 22 wherein when executed by the processor said instructions further cause the processor to:

present in the user interface a corresponding binding identifier for each of the one or more behavioral code to be extracted from the web page source code file, wherein the binding identifier is utilized within the inserted binding code in the web page source code file for referencing the corresponding extracted behavioral code, and wherein the user interface enables modification of the one or more binding identifier.

24. The system of claim 21 wherein said behavioral code comprises JavaScript code.

25. The system of claim 21 wherein said event handler code comprises event attributes defined by markup language code.

26. The system of claim 21 further comprising:

attaching the behavioral code to the web page source code file at run-time of the web page source code file.

* * * * *